Patented Sept. 11, 1951

2,567,250

UNITED STATES PATENT OFFICE 2,567,250

ALUMINUM RESINATES AND METHOD OF PREPARATION

William E. St. Clair and Ray V. Lawrence, New Orleans, La., assignors to the United States of America as represented by the Secretary of Agriculture No Drawing. Application July 25, 1950, Serial No. 175,853

7 Claims. (Cl. 260—97.5)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to new and improved metal resinates and to methods for their preparation. It particularly relates to improved aluminum resinates prepared from the condensation products of rosin materials, such as rosin derivatives, and rosin-containing materials with an aldehyde.

This invention is a continuation in part of applications, Serial No. 82,268, Serial No. 152,267, and Serial No. 152,268, all now abandoned. This invention is directed to a species of the metal resinates described in our copending application Serial No. 173,223, filed on July 11, 1950.

We have found that novel and improved metal resinates may be prepared by reacting rosin or rosin derivative, an aldehyde and a source of a metal. The various modes of reaction and the variations in type of reactants will be explained in detail below.

The metal resinates prepared according to our invention are generally characterized by increased metal content, conchoidal fracture, and improved solubility in low solvency hydrocarbons. Our products are moreover generally more stable to heat and air, compared with prior metal resinates.

By "metal" we mean any of those elements considered to be metals in the "Periodic Chart of the Elements" which appears in "General Chemistry," 5th edition (1944) by H. G. Deming, published by John W. Wiley and Sons, Inc.

The rosin material employed in our invention includes gum rosin, wood rosin, pine oleoresin, material containing rosin or rosin acids such as pine gum, heat-treated rosin, stabilized rosin such as disproportionated rosin, partially hydrogenated or partially dehydrogenated rosin, and polymerized or partially polymerized rosin. It also includes such materials as decarboxylated rosin, rosin oil, tall oil, esters of the rosin acids, such as methyl abietate, ester gum, vacuum strippings from rosin reactions, or any rosin-containing material which will react with an aldehyde under the conditions of our process as described herein. Metal resinates may be prepared from any of these rosins, rosin-containing materials, or rosin derivatives in accordance with our invention.

The aldehydes may be lower aliphatic aldehydes such as formaldehyde, acetaldehyde, and the like, carbocyclic or heterocyclic aldehydes such as benzaldehyde or furfural, or higher aliphatic aldehydes such as heptaldehyde, stearic aldehyde, and the like. The wide variety of aldehydes which may be employed is illustrated in the specific examples and tables which appear below. In general, substituted or unsubstituted aldehydes of from one to eighteen carbon atoms are suitable. The aldehydes may be used in the form of gases, liquids or solids, and may be either linear or cyclic polymers of aldehydes such as paraformaldehyde, paraldehyde, or any polymer or compound which will yield an aldehyde under the conditions of our invention such as methylal, acetal, etc., aqueous solution of aldehydes and other compounds which yield aldehydes on heating or other compounds in which an aldehyde is released either before or during the course of the reaction. The physical properties of the metal resinates obtained from rosin material and different aldehydes vary somewhat, yet all our resinates are generally characterized by the increased metal content, conchoidal fracture, and improved solubility as noted previously.

The metal source may be the metal oxide, hydroxide, carbonate, basic carbonate, metal salt of organic or inorganic acids such as the formate, lactate, acetate, basic acetate; or in some cases the finely divided metal may be used.

The properties of the metal resinates when they are formed will be influenced to some extent by the kind and amount of the particular metal compounds used in preparation. If an acid resinate is desired, for example, we prefer to start with a rosin material which has been reacted with 5% or less of an aldehyde. For essentially neutral metal resinates or for those which contain more metal than can be accounted for by the number of carboxyl groups present, we prefer to employ a rosin material which has been reacted with more than 5% of an aldehyde, and to add more aldehyde as necessary.

Within the broad scope of our invention, the properties of the particular metal resinates will vary somewhat, depending upon the proportion and kind of reactants and the particular mode of carrying out the reaction. For instance, the color of the metal resinates is generally light, yet some are characterized by darker color than the rest. This darker color characterizes the metal resinates using formaldehyde. The various combinations of metal source, aldehyde and rosin material and variations in proportion of these ingredients lead to a wide range of products. It is to be understood, however, that within these possible combinations there are rarely specific combinations which fail to produce resinates or which produce resinates not having the properties of metal content, fracture and solubility previously noted. These exceptions are, nevertheless few in number and do not detract materially from the operability of our broad method or the value of our broad class of products.

Our resins have the unique property of high solubility in the low solvency hydrocarbons, such as petroleum naphtha. These novel resins may be used as protective coatings, catalytic drying agents for unsaturated vegetable oils, fungicides, insecticides, bactericides, wood preservatives, surface undercoatings mildewproofing agents, rustproofing agents, wetting and dispersing agents, lubricating agents, waterproofing agents, catalysts, glazing ceramics, etc. Other and further important advantages of our resinates will become apparent from the following descriptions and examples.

The aldehyde may be reacted with rosin in several different ways. The amount of aldehyde giving the desired effects may vary from 0.01% to 30% based on the weight of the rosin material used.

A product that usually gives very satisfactory resinates may be formed by mixing the rosin and from 1% to 5% aldehyde together and heating to about 120 to 230° C. or higher without agitation. In cases where resinates of maximum metal content are desired, it may be advantageous to add more aldehyde as the metal compound is added. In some cases it may be advantageous to mix the aldehyde with the metal compound and add the mixture slowly to the hot rosin. Another method of preparation is to add the aldehyde to the molten metal resinate. In most cases it is advantageous to form the rosin-aldehyde reaction product first and to react this product with suitable metal compounds to form the metal resinate or mixed metal resinate. However, suitable resinates were prepared by mixing all the ingredients together and heating the mixture with or without mechanical agitation until the aldehyde refluxed, and then removing volatile substances from the reaction mixture, as necessary.

The rosin and aldehyde may be combined in a closed vessel under pressures greater than atmospheric. Such products may contain higher amounts of aldehyde than those reacted at atmospheric pressures. While metal resinates prepared from these products of high aldehyde content are usually less soluble in the low solvency hydrocarbon solvents than similar products prepared at atmospheric pressure, these resinates usually have better resistance to oxidation than resinates of low aldehyde content. It may also be advantageous to carry out the preparation of these resinates under an inert atmosphere. The rosin-aldehyde reaction product may be saponified with aqueous sodium hydroxide and the desired metal resinates formed by precipitation in dilute aqueous solution. However, many such resinates are almost completely insoluble in the common varnish solvents and do not lie within the scope of this invention.

While a catalyst may be used, and in some cases it may be desirable to catalyze the rosin-aldehyde reaction, we have found that in this process a catalyst was not necessary for the reaction of rosin with an aldehyde as very satisfactory products were prepared without the use of a catalyst. However, satisfactory products were also prepared by using an acid to catalyze the rosin-aldehyde reaction.

While the reaction of rosin and an aldehyde may be carried out in the presence of acetic acid and this product reacted with a suitable metal compound, the product formed in this manner is dissimilar to that product which is formed by the reaction of rosin and an aldehyde with a metal acetate. The rosin-aldehyde-acetic acid-metal compound product is usually not as soluble in the low boiling petroleum hydrocarbons as the rosin-aldehyde-metal acetate reaction product.

The process herein described may be applied generally to include the products which may result when rosin or pine gum containing one or more of the resin acids, or stabilized rosin, such as disproportionated rosin, partially hydrogenated or partially dehydrogenated rosin are treated with a suitable metal compound in conjunction with, prior to, or subsequent to the reaction with an aldehyde.

Also, the process as herein described may be applied generally to include the products which may result when rosin oil, tall oil, or esters of the resin acids, such as methyl abietate, ester gum, etc., are treated with a suitable metal compound in conjunction with, prior to, or subsequent to the reaction with an aldehyde. However, the products obtained by using these derivatives of rosin may vary widely in melting point, solubility, and other physical and chemical properties, etc., from those obtained with rosin.

In referring to metal resinates having a high metal content, we do not mean to limit ourselves to acid or even neutral metal resinates, but also to include products containing more metal than that required to react completely with the free carboxyl groups present. When we refer to the properties of these metal resinates, we refer to the property of the materials as a whole. This is done to avoid any controversy over whether the metal resinate itself or the concomitant impurities are responsible for the observed properties.

The metal acetate is a convenient source of the metal to use in the preparation of these products, but other forms of the metal, such as the metal oxide, hydroxide, formate, lactate, carbonate, basic acetate, basic carbonate, or in some cases the finely divided metal may be used, as noted previously.

If higher concentrations of volatile liquid aldehydes are desired, the reaction may be carried out in a closed reaction vessel under pressure to prevent loss of the aldehyde, or the entire reaction may be carried out under pressure greater than atmospheric, if desired.

Reactions involving more than 5% of a volatile aldehyde may be carried out in a closed reaction vessel under pressure, or in a vessel equipped with a reflux condenser. In this manner the metal compound can be added to the rosin-aldehyde mixture and the whole of the reactants refluxed until the reaction is completed. In some cases it is advantageous to remove some of the more volatile components after the reaction is completed. This can be accomplished by the usual methods, such as sparging with steam, sparging with an inert gas, or by vacuum stripping.

While the products prepared by our method are in some respects similar to some of the present metal resinates, there is considerable difference in many of their physical and chemical properties. These products prepared with an aldehyde show much greater solubility in the low solvency hydrocarbons, such as petroleum naphtha, than is shown by metal resinates prepared in the absence of an aldehyde.

We have found that mixtures of the aldehydes may be used advantageously to modify the rosin for the preparation of these metal resinates. In many cases the resinates obtained from the mixed aldehyde gave color grades better than those obtainable from either aldehyde used alone.

The properties of these metal resinates may also be varied to a considerable extent by using mixtures of two or more different metal compounds.

In general, as the metal content of a particular resinate is increased, the melting point is increased and the color of the product is darkened. The color is darker with some aldehydes and with some metal compounds than with others.

The following are among the variables that influence the physical and chemical characteristics of the various metal resinates.

1. Kind of aldehyde used.
2. Concentration of aldehyde used.
3. The particular metal used.
4. The individual salt of a particular metal used.
5. Concentration of metal used.
6. The type of rosin or rosin derivative used.
7. Reaction temperature.
8. Reaction time.

The metal resinates prepared by our method have improved solubility characteristics in the common varnish solvents, such as petroleum naphtha, turpentine, mineral spirits, aromatic type solvents, and terpene hydrocarbons.

The rates of solution of the resinates listed in the examples were determined by crushing approximately 2 grams of the resinate to pass an eight-mesh screen and adding the required amount of solvent at room temperature and determining the time required to dissolve the sample by shaking on an automatic shaking machine.

Our invention is advantageous in that our method permits the preparation of metal resinates which are difficult if not impossible to prepare by prior methods for preparing resinates. For example, in the known reaction of rosin with metal compounds to form metal resinates, the reaction apparently proceeds in the expected manner with the formation of a metal abietate or in some cases to form a mixed salt, such as the metal acetate-abietate, and in either case the metal content obtainable appears to be limited by the number of carboxyl groups available. However, we have discovered that such rosin derivatives as methyl abietate, ester gum, decarboxylated rosin, or rosin oil, having acid numbers of less than 20, when reacted with an aldehyde, would react with a suitable metal compound, such as the metal acetate to yield a clear, homogeneous, refusible metal resinate completely soluble in the ordinary varnish solvents. Likewise, when the higher molecular weight aldehydes are incorporated into rosin they produce metal resinates of improved color and solubility compared to the metal resinates prepared using formaldehyde. Liquid decarboxylated rosin with an acid number of less than 20, when reacted with 5% of benzaldehyde gave a product which contained more metal than could be accounted for by the reaction of the carboxyl groups with the metal compound to form either the metal diabietate, or the mixed abietate-acetate. The reaction must therefore proceed by a different mechanism than it does in the case of the rosin-metal compounds prepared in the absence of an aldehyde.

It is known that some metal compounds, when reacted with rosin, frequently set into a semi-crystalline infusible mass at concentrations of the metal far short of that which would theoretically neutralize the acid present in the rosin. Some of these products cannot be liquefied at temperatures below their decomposition point. When the reaction is carried out in a petroleum solvent, greater amounts of the metal compound may be added without "blocking" or "gelling" of the solution, but when the solvent is distilled from the reaction product, a semi-crystalline, infusible residue remains.

We have found that when a suitable metal compound is reacted with a rosin or rosin derivative in the presence of an aldehyde, this tendency to block is avoided and a homogeneous, clear, metal resinate, more soluble in hydrocarbon solvents than the metal resinate which has been prepared without the use of an aldehyde, is formed.

In general the metal resinates may be prepared at temperatures of from 90° C. to 400° C. depending on the type of rosin material used, the specific aldehyde used, and the specific metal compound of a particular metal used. For instance, rosin oil can be reacted with some aldehydes and some metal compounds at temperatures as low as 90° C. and some rosins can be reacted with some metal compounds as high as 400° C.

Aluminum resinates differ in several respects from all other resinates prepared. They have unusually high melting points and they seem to be characterized by very high temperatures of reaction and decomposition. Aluminum resinates generally have melting points in excess of 220° C., and do not decompose when heated at 370° C.

All aluminum resinates seem to have a high solubility, i. e. from 10 to 50% in petroleum naphtha, and are also soluble in Varsol and turpentine. They all have a very fast rate of solution, i. e. they dissolve in from 5 minutes to several hours. However, the aluminum resinates generally set into a gel on standing after being dissolved in solvent. These gels are unique in that the whole of the material is gelled, that is, solvent also, and the gels are very stable. Even shaking them on a shaking machine only causes the material to break temporarily, and upon again standing a short while, no change is apparent in the gel.

These resinates may find uses in such materials as greases and lubricants where a gel is desirable, and particularly a stable gel which is clear and colorless, i. e. as textile greases. In textile greases a clear, colorless grease is necessary which will leave no stain if splashed on the fabric.

The following examples are intended to be illustrative of the invention only. It is to be understood that they are not to be considered as limiting. For instance, the metal contents of the resinates prepared, in many cases, are maxima or are greater than found in the resinates of present day commerce. In every instance resinates may be made of lower metal content than illustrated, by the method of our invention.

EXAMPLE 1

One hundred parts of WW gum rosin were heated with 5 parts by weight of paraformaldehyde to about 130° C. without agitation. Agitation was commenced and 16.7 parts by weight of Al OH.($C_2H_3O_2$)$_2$ were added slowly as the temperature was gradually raised to 300° C. After two hours reaction time the product had the color grade H and required 3 hours to dissolve 20% solids in petroleum naphtha (B. P. 95–115° C.).

EXAMPLE 2

100 parts by weight of WW gum rosin were heated with 5 parts by weight of paraldehyde to about 130° C. without agitation. Agitation was commenced and 16.7 parts by weight of Al(OH).(C$_2$H$_3$O$_2$)$_2$ were added slowly as the temperature was gradually brought to 290° C. After five hours reaction time the product had the color grade I, a melting point (ring and ball) over 180° C., and took two hours to dissolve 20% solids in petroleum naphtha (B. P. 95–115° C.).

EXAMPLE 3

One hundred parts of WW gum rosin were heated to about 150° C. with 0.01 part paraformaldehyde, without agitation. Agitation was commenced and the temperature raised to about 230° C. 16.7 parts of Al(OH)(C$_2$H$_3$O$_2$)$_2$ were added and the temperature raised slowly to 305° C. After two hours reaction time the product had the color grade D, a melting point, ring and ball, over 160° C., and took one hour to dissolve 20% solids in petroleum naphtha (B. P. 95–115° C.) with a little precipitate.

EXAMPLES 4, 5, 6

One hundred parts of WW gum rosin and paraformaldehyde in the amounts indicated were heated to 170° C. without agitation. Agitation was commenced and the temperature was raised to 250° C. Basic aluminum acetate was added in the amounts indicated, slowly as the temperatures were raised to those listed in Table 1. After from 2 to 3 hours, the products had the characteristics shown in Table 1.

TABLE 1

*Aluminum resinates prepared using formaldehyde*

| Example number | 4 | 5 | 6 |
|---|---|---|---|
| Rosin, parts by weight | 100 | 100 | 100 |
| Paraformaldehyde, parts by weight | 1 | 5 | 10 |
| Basic aluminum acetate, parts by weight | 16.7 | 8.3 | 25 |
| Reaction time, hours | 3 | 2 | 3 |
| Maximum reaction temperature, °C | 300 | 310 | 340 |
| Color grade | G | H | B |
| Time in hours to dissolve 20% solids in petroleum naphtha (B. P. 95–115° C.) | [1] 1.5 | [1] 1/2 | [1] 4 |

[1] All aluminum resinates gel in naphtha after standing for short lengths of time.

EXAMPLES 7 TO 11

One hundred parts of rosin material as indicated in Table 2 were heated to about 130° C. with paraformaldehyde without agitation. The agitation was commenced and the temperature raised slowly to 230° C. Basic aluminum acetate was added slowly in the amounts indicated as the temperature was increased to that as listed. After 3 hours the products had the characteristics shown in Table 2.

TABLE 2

*Aluminum resinates prepared from different rosin derivatives*

| Example number | 7 | 8 | 9 | 10 | 11 |
|---|---|---|---|---|---|
| Rosin materials, parts by weight | 100 | 100 | 100 | 100 | 100. |
| Type rosin material | Tall oil | Methyl abietate | Ester gum | Rosin Drying Oil | Rosin oil. |
| Paraformaldehyde, parts by weight | 3 | 7 | 4 | 6 | 8. |
| Basic aluminum acetate, parts by weight | 16.7 | 16.7 | 16.7 | 16.7 | 16.7. |
| Reaction time, hours | 3 | 3 | 3 | 3 | 3. |
| Maximum reaction temperature, °C | 270 | 290 | 310 | 300 | 310. |
| Color grade | B | G | F | D | B. |
| Solubility in petroleum naphtha (B. P. 95–115° C.) | Immed. liquid at room temp. | Solid at room temp. | Gells in naphtha | Incompletely soluble. | Solid at room temp. |

The methyl abietate used in Example 8 had an acid number of 5.
The ester gum in used Example 9 had an acid number of 9.
The rosin drying oil used in Example 10 was prepared according to the method outlined in U. S. Patent 2,429,264 and had an acid number of 60.
The rosin oil used in Example 11 had an acid number of 17.

Having thus described our invention, we claim:

1. An aluminum resinate which does not decompose when heated at 370° C. and has a solubility of at least about 10% in petroleum naphtha and which sets to a gel in petroleum naphtha, being an aluminum resinate of aldehyde-reacted rosin material.

2. The product of claim 1 in which the rosin material is gum rosin and the aldehyde is formaldehyde.

3. The product of claim 1 in which the rosin material is rosin and the aldehyde is paraldehyde.

4. An aluminum resinate of an aldehyde-reacted rosin material prepared by reacting rosin material, aldehyde, and an aluminum material at a temperature of at least about 250° C., the aluminum material being one which yields its aluminum to the rosin material at the temperature of the reaction, being taken from the group consisting of aluminum, and aluminum carboxylates.

5. A process of preparing an aluminum resinate comprising heating basic aluminum acetate, rosin, and a formaldehyde yielding material at at least about 250° C.

6. A process of preparing an aluminum resinate comprising heating basic aluminum acetate with a rosin material and an aldehyde-yielding material at at least about 250° C.

7. A process of preparing an aluminum resinate comprising heating a rosin material, an aldehyde yielding material, and an aluminum material which yields aluminum to the rosin material at the temperature of heating, the heating being at at least about 250° C.

WILLIAM E. ST. CLAIR.
RAY V. LAWRENCE.

No references cited.